US012206873B2

(12) United States Patent
Cao

(10) Patent No.: US 12,206,873 B2
(45) Date of Patent: Jan. 21, 2025

(54) VIDEO ENCODING AND DECODING METHOD, APPARATUS AND COMPUTER DEVICE

(71) Applicant: Black Sesame Technologies Inc., San Jose, CA (US)

(72) Inventor: Wenfeng Cao, Shanghai (CN)

(73) Assignee: Black Sesame Technologies Inc., San Jose, CA (US)

(*) Notice: Subject to any disclaimer, the term of this patent is extended or adjusted under 35 U.S.C. 154(b) by 203 days.

(21) Appl. No.: 17/728,347

(22) Filed: Apr. 25, 2022

(65) Prior Publication Data

US 2022/0394283 A1 Dec. 8, 2022

(30) Foreign Application Priority Data

Jun. 2, 2021 (CN) .......................... 202110615456.9

(51) Int. Cl.
| | |
|---|---|
| *H04N 19/119* | (2014.01) |
| *H04N 19/146* | (2014.01) |
| *H04N 19/176* | (2014.01) |
| *H04N 19/33* | (2014.01) |

(52) U.S. Cl.
CPC ........... *H04N 19/33* (2014.11); *H04N 19/119* (2014.11); *H04N 19/146* (2014.11); *H04N 19/176* (2014.11)

(58) Field of Classification Search
CPC .... H04N 19/33; H04N 19/119; H04N 19/146; H04N 19/176
See application file for complete search history.

(56) References Cited

U.S. PATENT DOCUMENTS

| | | | | |
|---|---|---|---|---|
| 2013/0188045 | A1* | 7/2013 | Kalevo | G06V 20/52 348/143 |
| 2023/0269395 | A1* | 8/2023 | Yang | H04N 19/61 375/240.21 |

FOREIGN PATENT DOCUMENTS

| | | |
|---|---|---|
| CN | 110493600 A | 11/2019 |
| CN | 110636294 A | 12/2019 |
| CN | 111402126 A | 7/2020 |
| CN | 110519607 A | 5/2022 |
| JP | 2016110312 A | 5/2019 |

* cited by examiner

*Primary Examiner* — Dave Czekaj
*Assistant Examiner* — Berteau Joisil
(74) *Attorney, Agent, or Firm* — Timothy T. Wang; Ni, Wang & Massand, PLLC

(57) ABSTRACT

A video encoding/decoding method and apparatus, a computer device, and a storage medium. The method comprises: for each non-key frame in a video frame sequence, dividing a current non-key frame into a plurality of sub-image blocks according to information of an object in the current non-key image, and determining an importance level of each sub-image block; according to a pre-stored first correlation between different importance levels and different resolutions, performing conversion to make each sub-image block in each non-key frame have a resolution corresponding to the importance level of the sub-image block, wherein in the first correlation, a higher importance level corresponds to a higher resolution, and the highest importance level corresponds to a target highest resolution; and performing video encoding on the video frame sequence to obtain encoded video data. By means of the method, memory and bandwidth occupied by a video can be reduced.

7 Claims, 10 Drawing Sheets

FIG. 5

VIDEO ENCODING AND DECODING METHOD, APPARATUS AND COMPUTER DEVICE

CROSS REFERENCE TO RELATED APPLICATION

This patent application claims the benefit and priority of Chinese Patent Application No. 202110615456.9 filed on Jun. 2, 2021, the disclosure of which is incorporated by reference herein in its entirety as part of the present application.

TECHNICAL FIELD

The present application relates to the technical field of video encoding and decoding, and in particular, to a video encoding method and apparatus, a video decoding method and apparatus, a computer device, and a storage medium.

BACKGROUND

A video is a sequence of video frames consisting of successive frames. The original video frame sequence needs to occupy a lot of memory or bandwidth, which makes it difficult to store and transmit. Because of the similarity between successive frames, in order to facilitate storage and transmission, the original video can be encoded and compressed by video encoding technology. The original video format file is converted into another video format file to remove the redundancy of spatial and temporal dimensions. When the original video is required to be used, the original video frame sequence can be obtained through video decoding and restoration.

Common video encoding and decoding standards include H.261, H.263, and H.264 of the International Telecommunication Union. However, the foregoing existing video coding and decoding methods still need to occupy more memory and bandwidth, and there is room for optimization.

SUMMARY

Based on this, in view of the above technical problems, it is necessary to provide a video encoding method and apparatus, a video decoding method and apparatus, a computer device, and a storage medium capable of reducing memory or bandwidth usage.

In one aspect, provided is a video encoding method, comprising:

for each non-key frame in a video frame sequence, dividing a current non-key frame into a plurality of sub-image blocks according to information of an object in the current non-key image, and determining an importance level of each sub-image block, the video frame sequence comprising a plurality of non-key frames acquired at a predetermined frame rate; according to a pre-stored first correlation between different importance levels and different resolutions, performing conversion to make each sub-image block in each non-key frame have a resolution corresponding to the importance level of the sub-image block, wherein in the first correlation, a higher importance level corresponds to a higher resolution, and the highest importance level corresponds to a target highest resolution; and performing video encoding on the video frame sequence to obtain encoded video data.

In one embodiment, dividing a current non-key frame into a plurality of sub-image blocks according to information of an object in the current non-key image, and determining an importance level of each sub-image block comprise: for each non-key frame in a video frame sequence, acquiring the object in the current non-key frame and information of an object area occupied by the object; according to the object, the object area occupied by the object, and a pre-stored second correlation between different objects and different importance levels, determining an importance level corresponding to each object area in the non-key frame; dividing the non-key frame into a plurality of sub-image blocks according to a predetermined sub-image block size; and according to the importance level corresponding to each object area, determining an importance level corresponding to each sub-image block among the plurality of sub-image blocks.

In one embodiment, performing video encoding on the video frame sequence to obtain encoded video data comprises: for each non-key frame subjected to resolution conversion in the video frame sequence, performing video encoding on each sub-image block in the current non-key frame at different code rates according to a different importance level of the sub-image block, so as to obtain encoded video data, wherein in the same non-key frame, the higher the importance level of the sub-image block, the higher the code rate at which video encoding is performed.

In one embodiment, a video frame sequence further comprises a plurality of key frames collected at a variable frame rate; the video coding method further comprises: when conversion is performed to make each sub-image block in each non-key frame have a resolution corresponding to the importance level of the sub-image block, further making each key frame have the target highest resolution; performing video encoding on the video frame sequence to obtain encoded video data comprises: performing video encoding on the non-key frames subjected to resolution conversion and the key frame subjected to resolution conversion in the video frame sequence, to obtain encoded video data.

In one embodiment, the variable frame rate changes in real time according to the movement speed and/or position of a carrier device acquiring the video frame sequence.

In another aspect, provided is a video decoding method for performing video decoding on video data obtained by the video encoding method according to any one of the embodiments above, the video decoding method comprising: performing video decoding on video data to obtain a decoded video frame sequence, wherein in each non-key frame in the decoded video frame sequence, an object area having a higher importance level has a higher resolution; and reconstructing each non-key frame into a non-key frame having the target highest resolution, to obtain a reconstructed video frame sequence having the target highest resolution comprises.

In one embodiment, reconstructing each non-key frame into a non-key frame having the target highest resolution comprises: unifying, by a bilinear interpolation method, the resolution of each object area in each non-key frame into the target highest resolution.

In one embodiment, a decoded video frame sequence further comprises a plurality of key frames collected at a variable frame rate; reconstructing each non-key frame into a non-key frame having the target highest resolution, to obtain a reconstructed video frame sequence having the target highest resolution comprises: for each non-key frame, acquiring a time instant of collection of the current non-key frame and a position of a carrier device collects at the time instant of collection of the current non-key image; determining, from the plurality of key frames, a first key frame at the time closest to the time instant of collection and a second key frame at the position closest to the position at the time instant of collection; on the basis of the first key frame and the second key frame, and a pre-trained super-resolution model, determining interpolation data of an area, having a resolution lower than a target highest resolution, of the current non-key frame, so as to reconstruct the current non-key image into a non-key image having the target highest resolution, wherein the super-resolution model data is obtained by training with a predetermined number of frames collected from objects having importance levels lower than that corresponding to the target highest resolution; and combining the non-key frames reconstructed for each non-key frame and having the target highest resolution, to obtain a reconstructed video frame sequence having the target highest resolution.

In one embodiment, after reconstructing each of the non-key frames into a non-key frame having the target highest resolution, the method further comprises: performing deblocking filtering on the non-key frame having the target highest resolution.

In another aspect, provided is a video encoding apparatus, comprising:

a sub-image block level dividing module, configured to divide, for each non-key frame in a video frame sequence, a current non-key frame into a plurality of sub-image blocks according to information of an object in the current non-key image, and determine an importance level of each sub-image block, the video frame sequence comprising a plurality of non-key frames acquired at a predetermined frame rate;

a resolution conversion module, configured to perform, according to a pre-stored first correlation between different importance levels and different resolutions, conversion to make each sub-image block in each non-key frame have a resolution corresponding to the importance level of the sub-image block, wherein in the first correlation, a higher importance level corresponds to a higher resolution, and the highest importance level corresponds to a target highest resolution; and a video encoding module, configured to performing video encoding on the video frame sequence to obtain encoded video data.

In another aspect, provided is a video decoding apparatus, comprising:

a video decoding module, configured to perform video decoding on video data to obtain a decoded video frame sequence, wherein in each non-key frame in the decoded video frame sequence, an object area having a higher importance level has a higher resolution; and a video reconstructing module, configured to reconstruct each non-key frame into a non-key frame having the target highest resolution, to obtain a reconstructed video frame sequence having the target highest resolution.

In another aspect, provided is a computer device, comprising a memory and a processor, the memory storing a computer program, wherein when the computer program is executed by a processor, the steps of the video decoding method according to any one of the embodiments above are implemented.

In another aspect, provided is a computer device, comprising a memory and a processor, the memory storing a computer program, wherein when the computer program is executed by a processor, the steps of the video decoding method according to any one of the embodiments above are implemented.

In another aspect, provided is a computer readable storage medium, on which a computer program is stored, wherein when the computer program is executed by a processor, the steps of the video decoding method according to any one of the embodiments above are implemented.

In another aspect, provided is a computer readable storage medium, on which a computer program is stored, wherein when the computer program is executed by a processor, the steps of the video decoding method according to any one of the embodiments above are implemented.

According to the video encoding method and apparatus, the video decoding method and apparatus, the computer device, and the storage medium, during video encoding, a non-key frame is divided into a plurality of sub-image blocks according to the importance level of an object in each non-key frame, the importance level of each sub-image block is determined, a sub-image block having a higher importance level is encoded according to a higher resolution, and a sub-image block having a lower importance level is encoded according to more sub-resolutions, thereby reducing the memory and bandwidth occupied by the image area with lower importance level while preferentially ensuring the high coding quality of the image area with higher importance level, so as to effectively reduce the memory and bandwidth occupied by the video data obtained by encoding while ensuring the required encoding quality. During video decoding, by reconstructing each non-key frame into a non-key frame having the target highest resolution, the resolution and definition of the image area having lower resolution are improved, and it is ensured that the video frame sequence obtained by decoding has a good target highest resolution.

BRIEF DESCRIPTION OF DRAWINGS

FIG. 5 is a schematic spectrogram of sub-image blocks determined on the basis of the frame segmentation shown in FIG. 4 and importance levels corresponding to the sub-image blocks according to an embodiment:

DETAILED DESCRIPTION OF THE EMBODIMENTS

In order to make the purpose, technical solution and advantages of the present application more clear, the present application will be further described in detail below with reference to the accompanying drawings and embodiments. It should be understood that the embodiments described herein are only intended to explain the present disclosure, but not to limit the present disclosure.

Figure 1:
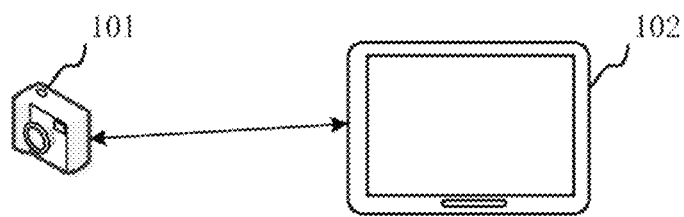
FIG. 1 is a diagram of an application environment of a video encoding method and a video decoding method according to an embodiment.

The video encoding method and the video decoding method provided in the present application can be applied to the application environment shown in FIG. 1, wherein the first device 101 obtains an original video frame sequence by acquiring a scene of a certain area around the first device 101 in real time, or obtains an original video frame sequence acquired in real time from another device, and encodes the collected video frame sequence by means of the video encoding method according to any one of the embodiments of the present application to obtain encoded video data; then the first device 101 may store the video data (for example, as a video file) or transmit the video data (for example, as a video stream) to the second device 102; after reading or receiving the encoded video data, the second device 102 decodes the video data by the video decoding method according to any one of the embodiments of the present application to obtain a video frame sequence having the target highest resolution, and then the second device 102 may play back a video composed of the video frame sequence.

The first device 101 and the second device 102 may be, but are not limited to, various vehicles, vehicle-mounted automobile data recorders, security monitoring devices, portable wearable devices, or components of these devices. The first device 101 and the second device 102 may belong to a same device, or separately belong to different devices.

For example, the first device 101 and the second device 102 may be an automobile data recorder (or a vehicle-mounted camera) and a display device which are respectively installed in the same vehicle, and the automobile data recorder encodes a collected video stream in real time by a video encoding method, transmits the encoded video data (video stream) to the display device, and stores the encoded video data locally. The display device decodes the received video stream by a video decoding method, and plays back same. For another example, the first device 101 and the second device 102 may be a monitoring device located at a monitoring site and a management terminal located at a management site, respectively. The monitoring equipment encodes the collected video stream in real time by the video encoding method, transmits the encoded video data (video stream) to the management terminal over the network and stores the encoded video data locally, and the management terminal decodes the received video stream by the video decoding method, and plays back same.

Figure 2:
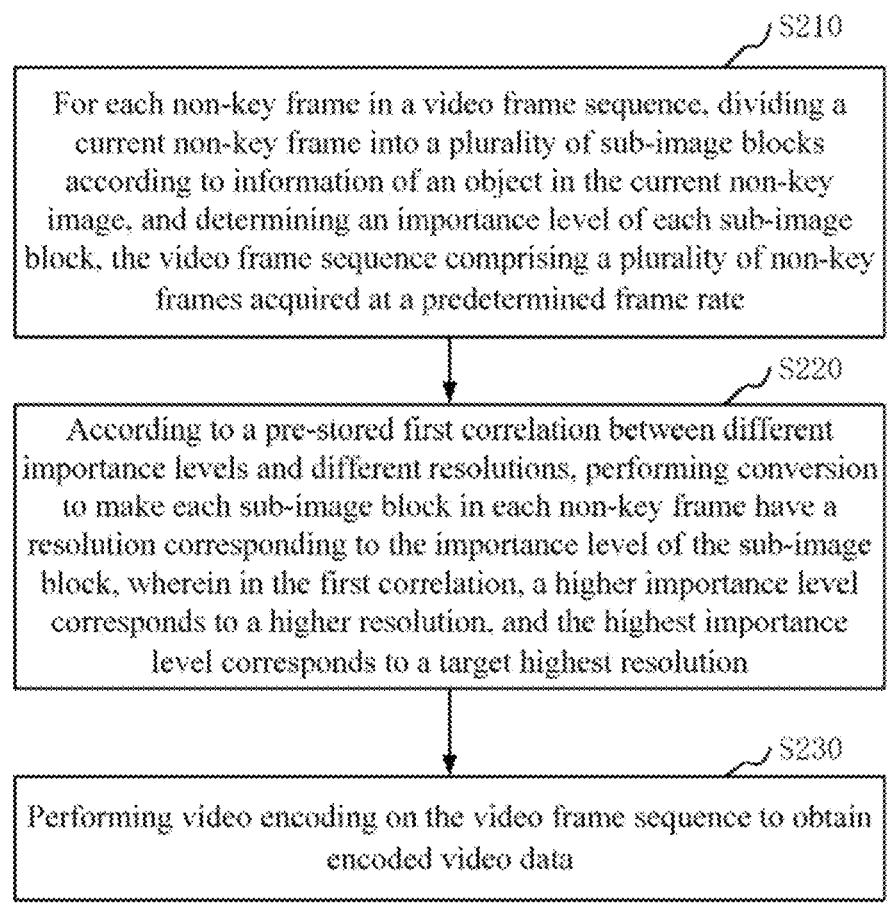
FIG. 2 is a flow chart of a video encoding method according to an embodiment.

In one embodiment, as shown in FIG. 2, a video encoding method is provided, for example, the method is applied to the first device 101 in FIG. 1, and comprises the following steps:

step S210, for each non-key frame in a video frame sequence, dividing a current non-key frame into a plurality of sub-image blocks according to information of an object in the current non-key image, and determining an importance level of each sub-image block, the video frame sequence comprising a plurality of non-key frames acquired at a predetermined frame rate.

The video frame sequence is composed of several consecutive frames, and the video frame sequence may be acquired by the first device 101. In this embodiment, the video frame sequence includes a plurality of non-key frames acquired at a predetermined frame rate. A non-key frame refers to a frame in a video frame sequence that is not defined as a key frame. As will be described below, in other embodiments, the video frame sequence may include a plurality of key frames in addition to a plurality of non-key frames. The predetermined frame rate may be set according to actual needs, for example, 20 frames/second or 30 frames/second or other values.

The object refers to an element within the field of view of the first device to be collected. For example, if the first device is a vehicle-mounted camera, the object may be, for example, other vehicles, pedestrians, roads, road signs, objects around the roads, trees, blue sky, etc.

The importance level refers to the importance of the object to be concerned, which can be specified in advance according to the actual requirements of the application scenario. For example, if the first device is a vehicle-mounted camera, road signs, license plates, pedestrians or objects near the vehicle on which the first device is mounted, etc. are more important information, while the background such as blue sky and trees, and pedestrians or objects in the distance are less important information. It can be divided into more than two importance levels, each importance level can correspond to one or more objects, and the number of importance levels and the number of objects corresponding to the importance levels are determined according to actual needs.

The administrator or user can specify different importance levels corresponding to different objects in advance, and store them. Thus, in this step, the first device may divide the current non-key frame into a plurality of sub-image blocks according to the information of the object identified from the current non-key frame, at the same time, the corresponding importance level of each sub-image block is determined according to the object included in each sub-image block.

Step S220, according to a pre-stored first correlation between different importance levels and different resolutions, performing conversion to make each sub-image block in each non-key frame have a resolution corresponding to the importance level of the sub-image block, wherein in the first correlation, a higher importance level corresponds to a higher resolution, and the highest importance level corresponds to a target highest resolution.

The resolution is a parameter characterizing the number of pixels in the horizontal and vertical directions in an image, which can be measured by the number of horizontal pixels multiplying the number of vertical pixels. The target highest resolution is the expected resolution of the decoded frame, and the target highest resolution may be specified as required, for example, the target highest resolution may be 1920×1080, 1280×720, or other values.

The administrator or the user may specify in advance different resolutions to be used for encoding image areas occupied by objects of different importance levels, and store them. The highest importance level corresponds to the target highest resolution, and the resolutions corresponding to the other importance levels other than the highest importance level decrease sequentially with the decrease of the importance level. In two adjacent importance levels, the resolution of the lower importance level is less than or equal to the resolution of the higher importance level, and all preset importance levels correspond to at least two different resolutions.

Figure 3:
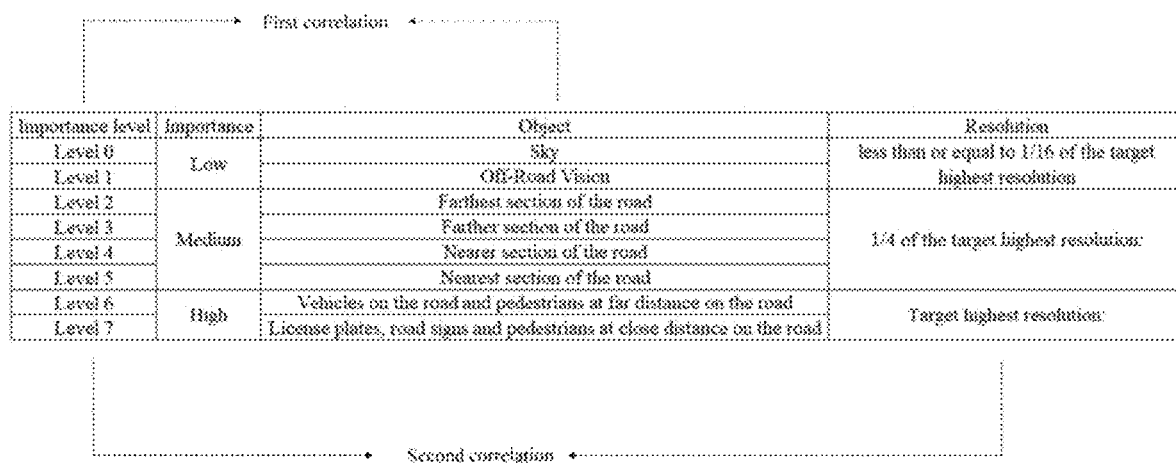
FIG. 3 is a schematic diagram of a first correlation and a second correlation according to an embodiment.

FIG. 3 shows an example of a first correlation by taking the first device as a vehicle-mounted camera as an example, and the seven importance levels in the example of FIG. 3 are correspondingly set with three different resolutions, wherein the levels 0-1 are encoded at a target highest resolution less than or equal to $1/16$ (e.g., 256×144), the levels 2-5 are encoded at a target highest resolution of $1/4$, and level 6-7 are encoded at a target highest resolution. FIG. 3 is merely exemplary, and the number of resolution types corresponding to the importance levels can also be set and adjusted as required. It can be understood that seven importance levels may correspond to at least two different resolutions or at most seven different resolutions.

Step S230, performing video encoding on the video frame sequence to obtain encoded video data.

In this step, video encoding is performed on each image frame in the video frame sequence processed in the foregoing steps. Specifically, if the video frame sequence includes non-key frames, video encoding is performed on the non-key frames in sequence, and if the video frame sequence includes both the non-key frame and the key frame, video encoding is performed on the non-key frames and the key frames in sequence. The video encoding in this step may be implemented in combination with the existing coding technology, for example, the video frame sequence obtained in the foregoing steps is integrated according to the H.264/H.265 SVC (Scalable Video Coding) coding framework, so as to obtain the encoded video data.

According to the video encoding method, during video encoding, a non-key frame is divided into a plurality of sub-image blocks according to the importance level of an object in each non-key frame, the importance level of each sub-image block is determined, a sub-image block having a higher importance level is encoded according to a higher resolution, and a sub-image block having a lower importance level is encoded according to more sub-resolutions, thereby reducing the memory and bandwidth occupied by the image area with lower importance level while preferentially ensuring the high coding quality of the image area with higher importance level, so as to effectively reduce the memory and bandwidth occupied by the video data obtained by encoding while ensuring the required encoding quality.

In one embodiment, dividing a current non-key frame into a plurality of sub-image blocks according to information of an object in the current non-key image, and determining an importance level of each sub-image block in step S210 comprise:

step S211, for each non-key frame in a video frame sequence, acquiring the object in the current non-key frame and information of an object area occupied by the object;

One or a combination of techniques such as image semantic segmentation, convolutional neural network (CNN) image recognition, ultrasonic radar depth information, laser radar point cloud information, and object tracking may be used. To identify one or more objects in each non-key frame and the object area each object occupies in the image, the object area of an object may be a region in which all pixels occupied by the object in the non-key frame are located. Specifically, image semantic segmentation and CNN image recognition can identify the object in the frame, that is, the identification information of the object; object tracking can dynamically track the objects in successive frames to obtain the movement trajectories of the objects; the ultrasonic radar depth information and the laser radar point cloud information may determine the depth information of the object, that is, the information of the distance between the object and the first device that collects the frame. Thus, different objects and object areas occupied by the respective objects may be distinguished by combining the identification information, the movement trajectory, and the distance information of the objects.

It can be understood that the process of identifying one or more objects in each non-key frame and the object area each object occupies in the image can be directly performed by the local first device, or can also be performed by other external devices other than the first device, the first device then receives, from the external device, information of the objects in the current non-key frame and the object area occupied by the objects.

Figure 4:
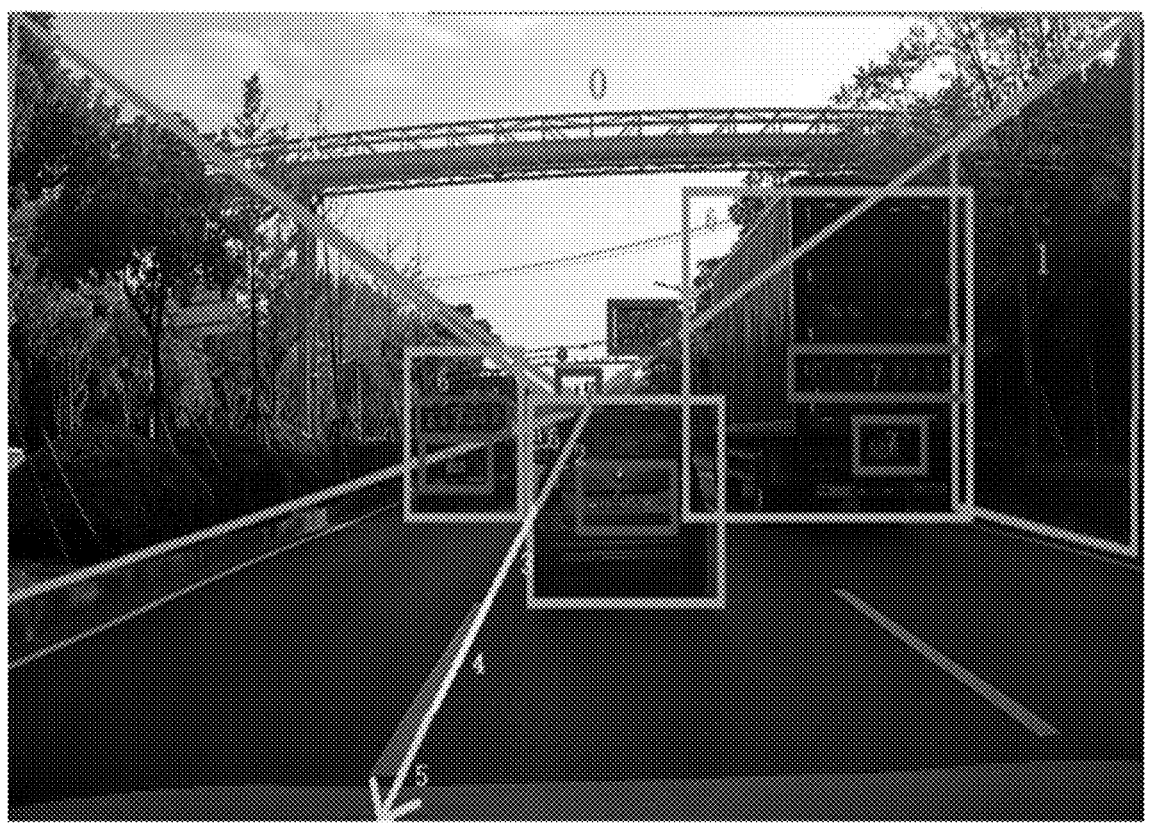
FIG. 4 is a schematic diagram of a frame in which an object and an object area are determined according to the first correlation and the second correlation shown in FIG. 3 according to an embodiment.

As shown in FIG. 4, object areas occupied by different objects and determined by identifying a certain non-key frame in one embodiment are shown, wherein a plurality of object areas are schematically indicated by a plurality of lines and boxes. It can be understood that the lines and boxes in FIG. 4 are only schematic, the actual object area can be divided with the precision of pixels or pixel blocks, and accordingly, the object area may have an irregular shape.

Step S212, according to the object, the object area occupied by the object, and a pre-stored second correlation between different objects and different importance levels, determining an importance level corresponding to each object area in the non-key frame.

The administrator or user can specify different importance levels corresponding to different objects in advance, and store them. For example, the first device is a vehicle-mounted camera, FIG. 3 shows an example of a second correlation, and for the seven importance levels in the example of FIG. 3, each importance level corresponds to one or more objects. Level 0 corresponds to the sky, level 1 corresponds to the distant view outside the road, level 2 corresponds to the farthest section of the road, level 3 corresponds to the farther section of the road, level 4 corresponds to the nearer section of the road, level 5 corresponds to the nearest section of the road, level 6 corresponds to vehicles on the road and pedestrians at far distance on the road, and level 7 corresponds to license plates, road signs and pedestrians at close distance on the road.

For example, according to the second correlation shown in FIG. 3, the importance level corresponding to each object area as shown in FIG. 4 can be determined, and the importance levels corresponding to the object areas indicated by the respective lines and boxes are marked with numbers in FIG. 4.

Step S213, dividing the non-key frame into a plurality of sub-image blocks according to a predetermined sub-image block size.

For example, the sub-image block may have a size of 16-16 pixels, or other suitable sizes.

In this step, the first device divides, according to a predetermined sub-image block size, the non-key frame into a plurality of sub-image blocks having the sub-image block size.

Step S214, according to the importance level corresponding to each object area, determining an importance level corresponding to each sub-image block among the plurality of sub-image blocks.

If all pixels in a certain sub-image block divided in step S213 belong to the object area of the same importance level, it is directly determined that the sub-image block corresponds to the importance level; if the pixels in a certain sub-image block belong to multiple object areas having different importance levels, it is necessary to further determine to which importance level the sub-image block should be classified.

In one embodiment, if the pixels in a certain sub-image block belong to a plurality of object areas having different importance levels, the importance level corresponding to the pixel having the largest number ratio may be selected as the importance level of the sub-image block.

In another embodiment, if the pixels in a certain sub-image block belong to a plurality of object areas having different importance levels, the highest importance level is selected, as the importance level of the sub-image block, from the importance levels corresponding to the pixels of which the quantity ratio is greater than a first predetermined value or the absolute quantity is greater than a second predetermined value, thereby preferentially ensuring the encoding quality of the pixels having a high importance level.

Figure 5:
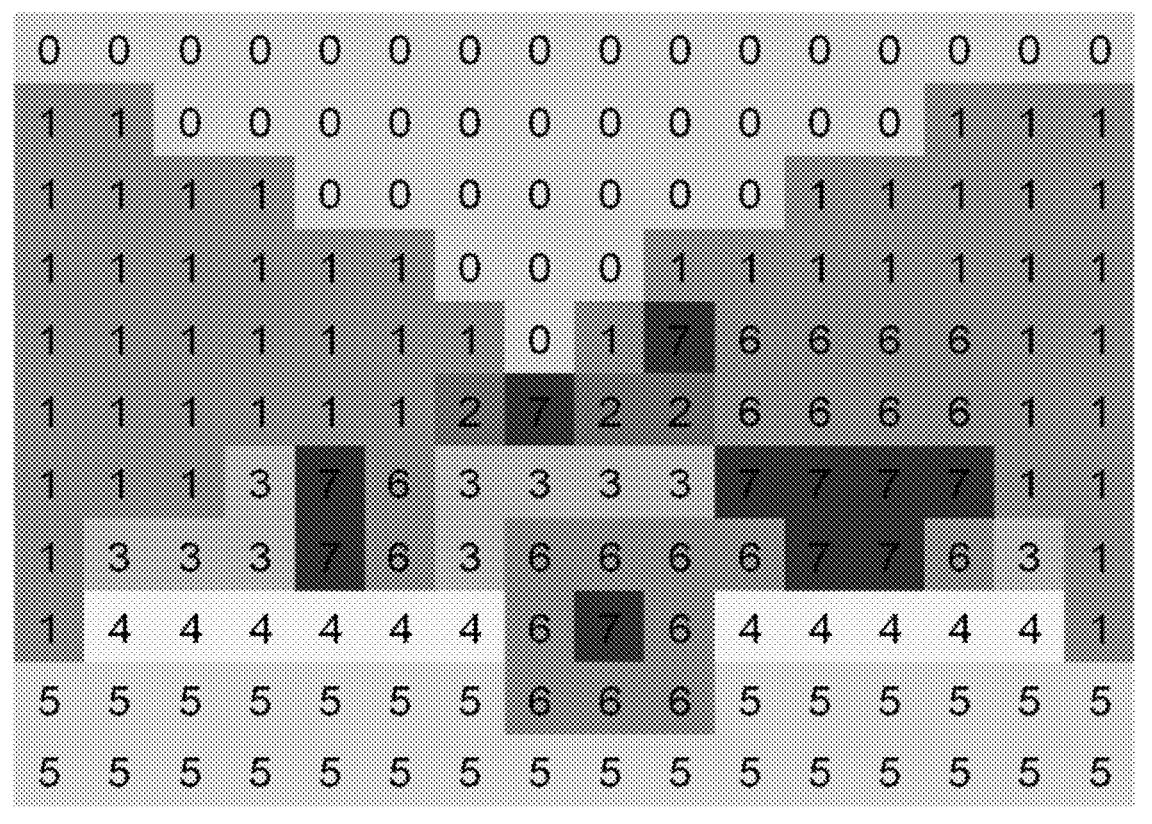

For example, after dividing the non-key frame, as shown in FIG. 4, having the importance level corresponding to each object area marked into sub-image blocks according to the size of 16×16 sub-image blocks, and determining the importance level corresponding to each sub-image block, the obtained map is as shown in FIG. 5, wherein the divided sub-image blocks and the importance levels corresponding to each sub-image block are shown.

In one embodiment, performing video encoding on the video frame sequence to obtain encoded video data in step S240 comprises: for each non-key frame subjected to resolution conversion in the video frame sequence, performing video encoding on each sub-image block in the current non-key frame at different code rates according to a different importance level of the sub-image block, so as to obtain encoded video data, wherein in the same non-key frame, the higher the importance level of the sub-image block, the higher the code rate at which video encoding is performed.

The adjustment of the encoding rate of the sub-image block may be realized by adjusting a Quantizer Parameter (QP) allocated to the sub-image block. The larger the value of the QP is, the smaller the corresponding code rate is. In the embodiment of the present application, the encoding rate allocated to each frame may be determined in real time by means of a variable bit-rate (VBR). In cases where the code rate allocated to a certain frame of the non-key frame is determined, the code rate may be further allocated in the non-key frame according to the importance level of each sub-image block, and a smaller QP will be allocated to a sub-image block having a higher importance level, so that in the non-key frame, the higher the importance level of the sub-image block, the higher the code rate at which video encoding is performed. If the video frame sequence includes a key frame in addition to a non-key frame, the key frame may be directly encoded at the encoding rate allocated to the key frame as determined by the VBR in real time.

In the same non-key frame, the code rates corresponding to the importance levels are sequentially decreased with the decrease of the importance levels, and in two adjacent importance levels, the code rate having a lower importance level is less than or equal to the code rate having a higher importance level, so that all the importance levels in the same non-key frame correspond to at least two different code rates.

In this example, in the same non-key frame, the number of importance levels is the same as the number of types of the allocated code rates, for example, as shown in FIG. 3, seven importance levels correspond to seven different allocated code rates. However, it can be understood that the seven importance levels may also correspond to, for example, at least two different code rates.

Figure 6:
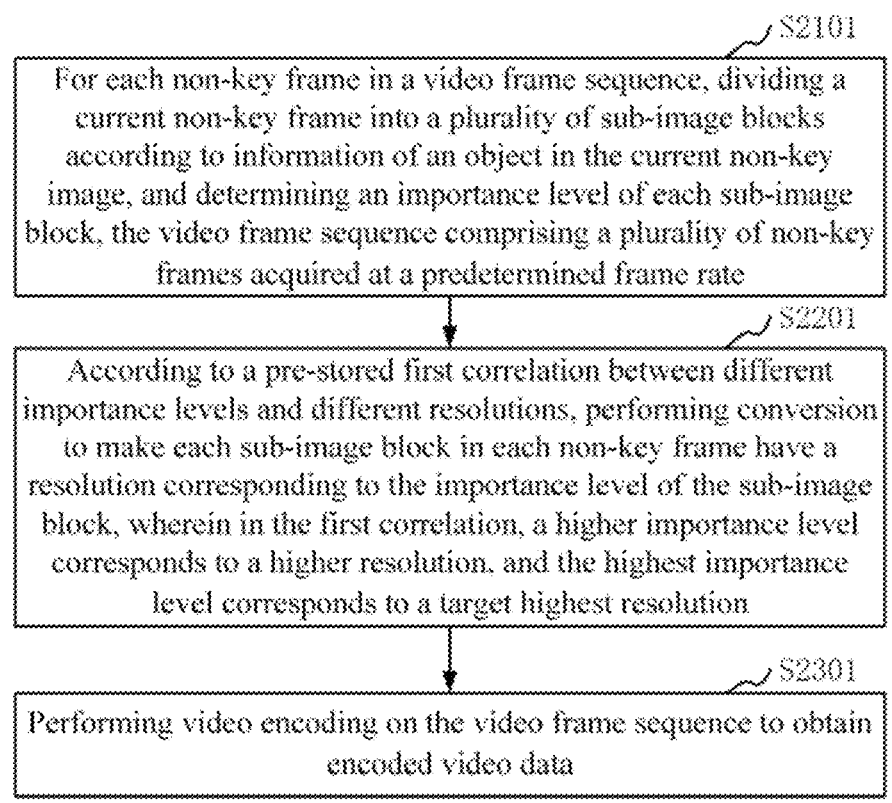
FIG. 6 is a flowchart of a video encoding method according to another embodiment.

In one embodiment, as shown in FIG. 6, step S210 includes step S2101, and in step S2101, on the basis of the step S210, the video frame sequence further includes a plurality of key frames acquired at a variable frame rate. That is, in the continuous frames included in the originally acquired video frame sequence, images acquired at a variable frame rate are taken as key frames, and the remaining images are taken as non-key frames. The variable frame rate changes in real time according to the movement speed and/or position of a carrier device acquiring the video frame sequence. The value of the variable frame rate, or the value range of the variable frame rate, can be determined according to actual needs, for example, the value of the variable frame rate can be about 1 frame/20 seconds, which fluctuates up and down in real time according to the movement speed and/or position of the carrier device, or fluctuate up and down based on other values.

Step S220 includes step S2201, in step S2201, on the basis of step S220, when conversion is performed to make each sub-image block in each non-key frame have a resolution corresponding to the importance level of the sub-image block, each key frame is further made to have the target highest resolution.

The original non-key frame and the original key frame which are acquired by the first device may have the highest target resolution, so that it is not necessary to perform sub-image block division and resolution adjustment in steps S210 and S220 on the key frames, and the original key frame and the non-key frame subjected to resolution conversion are combined directly according to the acquisition timing, so as to form a video frame sequence on which video encoding is to be performed.

Performing video encoding on the non-key frames subjected to resolution conversion and the key frame subjected to resolution conversion in the video frame sequence, to obtain encoded video data in step S230 comprises: step S2301: performing video encoding on the non-key frames subjected to resolution conversion and the key frame subjected to resolution conversion in the video frame sequence, to obtain encoded video data.

In this step, the non-key frames subjected to resolution conversion in the video frame sequence may be encoded according to the details discussed in the above embodiments, and the key frames in the video frame sequence may be directly encoded according to a conventional encoding method such as H.264/H.265 IDR.

In one embodiment, the variable frame rate changes in real time according to the movement speed of a carrier device acquiring the video frame sequence, wherein the greater the movement speed of the carrier device is, the greater the variable frame rate is. The carrier device may be a first device, such as a vehicle-mounted camera, or a device on which the first device is mounted, such as a vehicle. In this way, a key frame can be acquired at a higher frame rate when the movement speed is high, thereby guaranteeing the quality of video data encoded when a carrier device, such as a vehicle, moves at a high speed.

In one embodiment, the variable frame rate changes in real time according to the position of a carrier device acquiring the video frame sequence, wherein compared with a non-important area, when it is detected that the position of the carrier device is in a predetermined important area, the variable frame rate is greater.

The important area may be specified in advance, and may be acquired by the first device in this step. For example, if the carrier device is a vehicle, the important area may be an accident-prone road section. When the carrier arrives at the important area, the frame rate for acquiring key frames is improved, and the encoding quality of the video acquired in the important area can be ensured preferentially.

Figure 7:
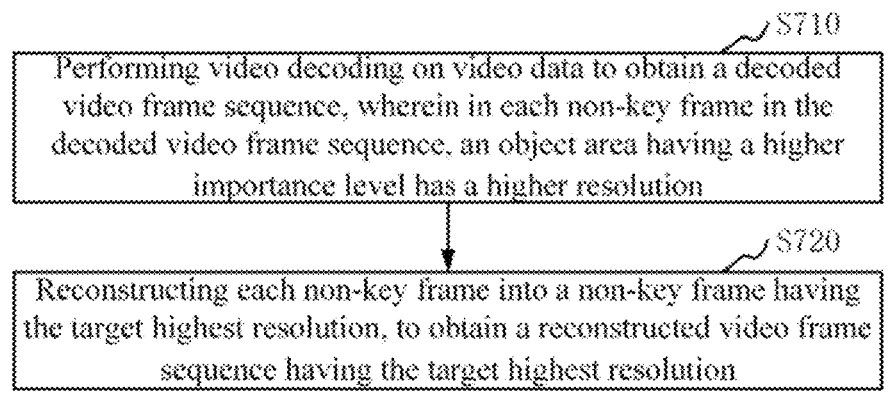
FIG. 7 is a flowchart of a video decoding method according to an embodiment.

In one embodiment, as shown in FIG. 7, a video decoding method is provided, which is used for performing video decoding on video data obtained by the video encoding method of any one of the foregoing embodiments. The video decoding method is described by using an example in which the video decoding method is applied to the second device 102 in FIG. 1. The video decoding method includes:

step S710, performing video decoding on video data to obtain a decoded video frame sequence, wherein in each non-key frame in the decoded video frame sequence, an object area having a higher importance level has a higher resolution; and Step S720, reconstructing each non-key frame into a non-key frame having the target highest resolution, to obtain a reconstructed video frame sequence having the target highest resolution.

In the video decoding method, during video decoding, by reconstructing each non-key frame into a non-key frame having the target highest resolution, the resolution and definition of the image area having lower resolution are improved, and it is ensured that the video frame sequence obtained by decoding has a good target highest resolution.

In one embodiment, reconstructing each non-key frame into a non-key frame having the target highest resolution in step S720 comprises: unifying, by a bilinear interpolation method, the resolution of each object region in each non-key frame into the target highest resolution.

In this embodiment, the resolution of the region lower than the target highest resolution in the current non-key frame is increased by the bilinear difference method, so that the current non-key frame can be simply and quickly reconstructed into a non-key frame having the target highest resolution.

In another embodiment, a decoded video frame sequence further comprises a plurality of key frames collected at a variable frame rate; reconstructing each non-key frame into a non-key frame having the target highest resolution, to obtain a reconstructed video frame sequence having the target highest resolution in step S720 comprises: for each non-key frame, acquiring a time instant of collection of the current non-key frame and a position of a carrier device collects at the time instant of collection of the current non-key image; determining, from the plurality of key frames, a first key frame at the time closest to the time instant of collection and a second key frame at the position closest to the position at the time instant of collection; on the basis of the first key frame and the second key frame, and a pre-trained super-resolution model, determining interpolation data of a region, having a resolution lower than a target highest resolution, of the current non-key frame, so as to reconstruct the current non-key image into a non-key image having the target highest resolution, wherein the super-resolution model data is obtained by training a predetermined number of frames pre-collected by the carrier device at various predetermined positions and having a resolution greater than or equal to the highest target resolution; and combining the non-key frames reconstructed for each non-key frame and having the target highest resolution, to obtain a reconstructed video frame sequence having the target highest resolution.

The position may be obtained by a positioning device on the carrier device that acquires the frame, and the positioning device may be, for example, a global positioning system (GPS), an inertial navigation system (INS), etc.

In this embodiment, a pre-trained super-resolution model can be acquired in a second device, or the second device can invoke the pre-trained super-resolution model from other devices or a server, the super-resolution model can be obtained by training frames pre-collected by a carrier device at various positions; and these pre-collected frames have a resolution greater than or equal to the target highest resolution, and have a sufficiently high resolution (i.e., being higher than or equal to a predetermined required resolution). Further, these pre-collected frames may be pre-downscaled and then used to train the super-resolution model. For example, if the first device is a vehicle-mounted camera, the server may collect frames having the target highest resolution and acquired by vehicle-mounted cameras on different vehicles at different locations of various roads. Then, the server can use the frame having the target highest resolution and corresponding to each position to perform training to obtain a super-resolution model and store it. Thus, in this embodiment, the second device may input, into the super-resolution model, a position at which the current non-key frame is acquired, to obtain an estimated frame having the target highest resolution at the position, and then may determine, on the basis of the first and second key frames and the estimated frame, interpolation data of an area having a resolution lower than a target highest resolution, of the current non-key frame, so as to reconstruct the current non-key image into a non-key image having the target highest resolution.

In this embodiment, by combining a first key frame and a second key frame with a pre-trained super-resolution model, and determining interpolation data of an area having a resolution lower than a target highest resolution, of the current non-key frame, so as to reconstruct the current non-key image into a non-key image having the target highest resolution, the resolution and definition of the non-key frame can be re-established and improved with high quality.

In one embodiment, reconstructing each non-key frame into a non-key frame having the target highest resolution, to obtain a reconstructed video frame sequence having the target highest resolution in step S720, comprises: reconstructing each of the non-key frames into a non-key frame having the target highest resolution, and performing deblocking filtering on the non-key frame having the target highest resolution, so as to obtain a reconstructed video frame sequence having the target highest resolution.

In this embodiment, by performing the deblocking filtering, it is possible to reduce the abrupt changes and defects of the sub-image block boundaries, so that the transition between adjacent sub-images is smoother, and the display effect of the reconstructed video frame sequence is effectively improved.

It should be understood that although the steps in the flowcharts of FIG. 2, FIG. 6, and FIG. 7 are shown in the order indicated by the arrows, the steps are not necessarily performed in the order indicated by the arrows. Unless explicitly stated herein, the steps are not performed in a strict order and may be performed in other orders. Furthermore, at least some of the steps in FIG. 2, FIG. 6 and FIG. 7 may include a plurality of sub-steps or a plurality of stages, and these sub-steps or stages may not necessarily be executed at the same time, but may be executed at different times, and the execution order of these sub-steps or stages may not necessarily be sequential, but may be performed alternately or alternatively with at least some of other steps or sub-steps or stages of other steps.

Figure 8:
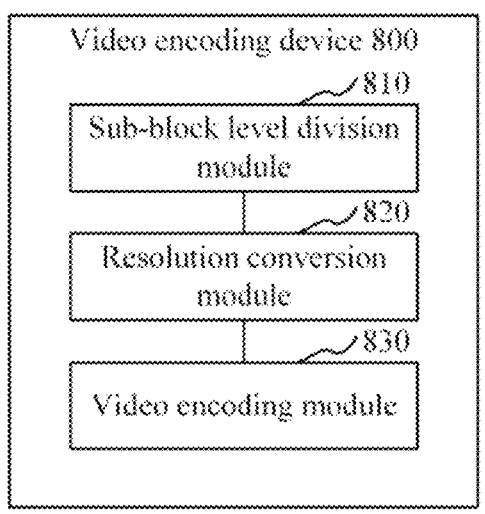
FIG. 8 is a structural block diagram of a video encoding apparatus according to an embodiment.

In one embodiment, as shown in FIG. 8, provided is a video encoding apparatus 800, comprising a sub-block level division module 810, a resolution conversion module 820, and a video encoding module 830.

The sub-image block level dividing module 810 is configured to divide, for each non-key frame in a video frame sequence, a current non-key frame into a plurality of sub-image blocks according to information of an object in the current non-key image, and determine an importance level of each sub-image block, the video frame sequence comprising a plurality of non-key frames acquired at a predetermined frame rate.

The resolution conversion module 820 is configured to perform, according to a pre-stored first correlation between different importance levels and different resolutions, conversion to make each sub-image block in each non-key frame have a resolution corresponding to the importance level of the sub-image block, wherein in the first correlation, a higher importance level corresponds to a higher resolution, and the highest importance level corresponds to a target highest resolution.

The video encoding module 830 is configured to performing video encoding on the video frame sequence to obtain encoded video data.

Figure 9:
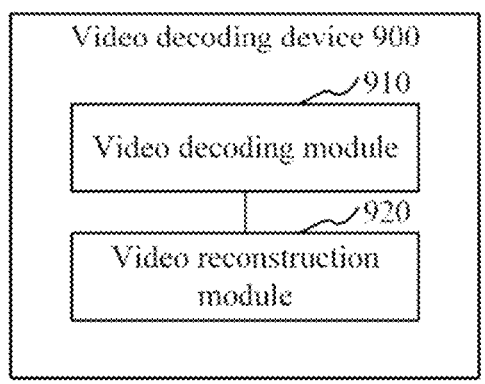
FIG. 9 is a structural block diagram of a video decoding apparatus according to an embodiment.

In one embodiment, as shown in FIG. 9, a video decoding apparatus 900 is provided. The video decoding apparatus 90) is configured to perform video decoding on video data obtained by the video coding method according to any one of the foregoing embodiments. The video decoding apparatus 900 includes:

a video decoding module 910, configured to perform video decoding on video data to obtain a decoded video frame sequence, wherein in each non-key frame in the decoded video frame sequence, an object region having a higher importance level has a higher resolution; and a video reconstructing module 920, configured to reconstruct each non-key frame into a non-key frame having the target highest resolution, to obtain a reconstructed video frame sequence having the target highest resolution.

For a specific limitation of the video encoding apparatus 800, reference may be made to the foregoing limitation on the video encoding method, and for a specific limitation of the video decoding apparatus 900, reference may be made to the foregoing limitation on the video decoding method, and details are not repeatedly described herein. Each module in the video encoding device 800 and the video decoding device 900 may be implemented wholly or in part by software, hardware, or a combination thereof. The modules above may be embedded in or independent of a processor in a computer device in the form of hardware, or may be stored in a memory in the computer device in the form of software, so that the processor can call and execute the operations corresponding to the above modules.

Figure 10:
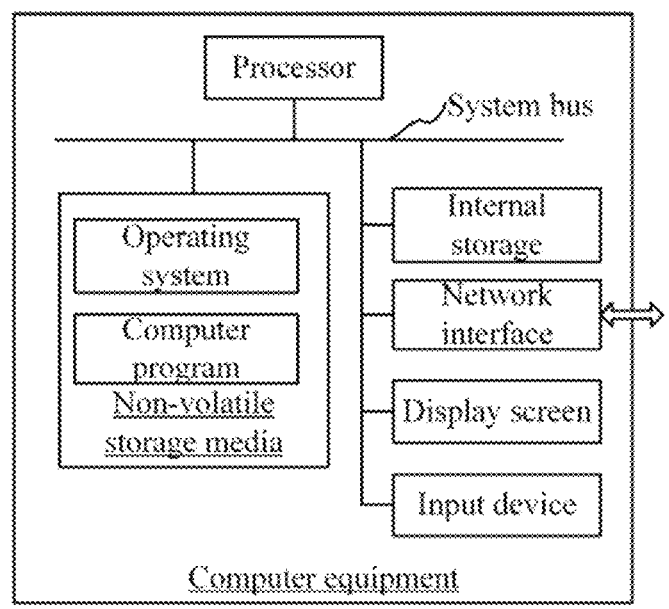
FIG. 10 is an internal structure diagram of a compute device according to an embodiment.

In one embodiment, a computer device is provided, and the internal structure of the computer device may be as shown in FIG. 10. The computer device includes a processor, a memory, a network interface, a display screen and an input device that are connected by a system bus. The processor of the computer device is used to provide computing and control capabilities. The memory of the computer device includes a non-volatile storage medium and an internal memory. The non-volatile storage medium stores an operating system and a computer program. The internal memory provides an environment for the running of the operating system and computer programs in the non-volatile storage medium. The network interface of the computer device is used for communication with an external terminal by a network connection. The computer program is executed by a processor to implement a video encoding method or a video decoding method. The display screen of the computer device may be a liquid crystal display screen or an electronic ink display screen; the input device of the computer device may be a touch layer covered on the display screen, may also be a key, a trackball or a touch control panel arranged on the housing of the computer device, and may also be an external keyboard, a touch control panel or a mouse, etc.

Those skilled in the art can understand that the structure shown in FIG. 10 is only a block diagram of a part of the structure related to the solution of the present application, and does not constitute a limitation to the computer device to which the solution of the present application is applied, and a specific computer device may include more or less components than those shown in the figure, or combine some components, or have a different arrangement of components.

In one embodiment, provided is a computer device comprising a memory and a processor, the memory having stored therein a computer program, the processor when executing the computer program implementing the steps of:

for each non-key frame in a video frame sequence, dividing a current non-key frame into a plurality of sub-image blocks according to information of an object in the current non-key image, and determining an importance level of each sub-image block, the video frame sequence comprising a plurality of non-key frames acquired at a predetermined frame rate;

according to a pre-stored first correlation between different importance levels and different resolutions, performing conversion to make each sub-image block in each non-key frame have a resolution corresponding to the importance level of the sub-image block, wherein in the first correlation, a higher importance level corresponds to a higher resolution, and the highest importance level corresponds to a target highest resolution; and performing video encoding on the video frame sequence to obtain encoded video data.

In other embodiments, the processor, when executing the computer program, also implements the steps of the video encoding method according to any one of the embodiments, and has corresponding advantageous effects.

In one embodiment, provided is a computer device for performing video decoding on video data obtained by the video encoding method of any one of the above embodiments, the computer device comprising a memory and a processor, the memory storing a computer program, the processor executing the computer program to implement the following steps:

performing video decoding on video data to obtain a decoded video frame sequence, wherein in each non-key frame in the decoded video frame sequence, an object area having a higher importance level has a higher resolution; and reconstructing each non-key frame into a non-key frame having the target highest resolution, to obtain a reconstructed video frame sequence having the target highest resolution.

In other embodiments, the processor, when executing the computer program, also implements the steps of the video decoding method according to any one of the embodiments, and has corresponding advantageous effects.

In one embodiment, provided is a computer readable storage medium having stored thereon a computer program which, when executed by a processor, implements the steps of:

for each non-key frame in a video frame sequence, dividing a current non-key frame into a plurality of sub-image blocks according to information of an object in the current non-key image, and determining an importance level of each sub-image block, the video frame sequence comprising a plurality of non-key frames acquired at a predetermined frame rate;

according to a pre-stored first correlation between different importance levels and different resolutions, performing conversion to make each sub-image block in each non-key frame have a resolution corresponding to the importance level of the sub-image block, wherein in the first correlation, a higher importance level corresponds to a higher resolution, and the highest importance level corresponds to a target highest resolution; and performing video encoding on the video frame sequence to obtain encoded video data.

In other embodiments, the computer program, when executed by the processor, further implements the steps of the video encoding method of any of the embodiments, and has corresponding advantageous effects.

In one embodiment, provided is a computer readable storage medium for performing video decoding on video data obtained by the video encoding method of any one of the above embodiments, the computer readable storage medium having a computer program stored thereon, the computer program, when executed by a processor, implementing the following steps:

performing video decoding on video data to obtain a decoded video frame sequence, wherein in each non-key frame in the decoded video frame sequence, an object area having a higher importance level has a higher resolution; and reconstructing each non-key frame into a non-key frame having the target highest resolution, to obtain a reconstructed video frame sequence having the target highest resolution.

In other embodiments, the computer program, when executed by the processor, further implements the steps of the video decoding method of any one of the embodiments, and has corresponding advantageous effects.

Those ordinary skilled in the art can understand that implementation of all or pan of flows in the method of the above embodiments can be completed through setting a computer program to instruct related hardware. The computer program can be stored in a non-volatile computer-readable storage medium, and when executed, the computer program can include the processes of the embodiments of the above methods. Any reference to the memory, storage, database, or other medium used in the embodiments provided herein may include non-volatile and/or volatile memory.

The non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in a variety of form, such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus Direct RAM (RDRAM), Direct Rambus Dynamic RAM (DRDRAM), and Rambus Dynamic RAM (RDRAM).

Various technical features of the above embodiments can be combined arbitrarily. For the sake of simplicity, all possible combinations of the technical features in the above embodiments are not described. However, as long as there is no contradiction between the combinations of these technical features, they should be considered to be within the scope of this specification.

The above embodiments only represent several embodiments of the present application, and the description thereof is more specific and detailed, but shall not be construed as limiting the scope of the invention patent. It should be noted that it will be apparent to those of ordinary skill in the art that numerous variations and modifications may be made without departing from the spirit of the present application. These are all within the scope of protection of the present application. Accordingly, the scope of protection of this application for patent should be determined by the appended claims.

What is claimed is:

1. A video coding method, the method comprising:

for each non-key frame in a video frame sequence, dividing a current non key frame into a plurality of sub image blocks according to information of an object in the current non key image, and determining an importance level of each sub image block, the video frame sequence comprising a plurality of non-key frames acquired at a predetermined frame rate;

according to a pre-stored first correlation between different importance levels and different resolutions, performing conversion to make each sub image block in each non-key frame have a resolution corresponding to the importance level of the sub image block, wherein in the first correlation, a higher importance level corresponds to a higher resolution, and the highest importance level corresponds to a target highest resolution;

performing video encoding on the video frame sequence to obtain encoded video data performing video decoding on video data to obtain a decoded video frame sequence, wherein in each non-key frame in the decoded video frame sequence, an object area having a higher importance level has a higher resolution;

reconstructing each non-key frame into a non-key frame having the target highest resolution, to obtain a reconstructed video frame sequence having the target highest resolution wherein the decoded video frame sequence further comprises a plurality of key frames acquired at a variable frame rate:

reconstructing each non-key frame into a non-key frame having the target highest resolution, to obtain a reconstructed video frame sequence having the target highest resolution comprises:

for each non-key frame, acquiring a time instant of collection of the current non-key frame and a position of a carrier device collects at the time instant of collection of the current non-key image:

determining, from the plurality of key frames, a first key frame at the time closest to the time instant of collection and a second key frame at the position closest to the position at the time instant of collection;

on the basis of the first key frame and the second key frame, and a pre-trained super-resolution model, determining interpolation data of an area, having a resolution lower than a target highest resolution, of the current non-key frame, so as to reconstruct the current non-key image into a non-key image having the target highest resolution. wherein the super-resolution model data is obtained by training with a predetermined number of frames collected from objects having importance levels lower than that of the target highest resolution; and combining the non-key frames reconstructed for each non-key frame and having the target highest resolution, to obtain a reconstructed video frame sequence having the target highest resolution.

2. The video encoding method according to claim 1, wherein dividing a current non-key frame into a plurality of sub-image blocks according to information of an object in the current non-key image, and determining an importance level of each sub image block comprise:

for each non key frame in a video frame sequence, acquiring the object in the current non key frame and information of an object area occupied by the object;

according to the object, the object area occupied by the object, and a pre-stored second correlation between different objects and different importance levels, determining an importance level corresponding to each object area in the non-key frame;

dividing the non-key frame into a plurality of sub image blocks according to a predetermined sub image block size; and according to the importance level corresponding to each object area, determining an importance level corresponding to each sub image block among the plurality of sub-image blocks.

3. The video encoding method according to claim 1, wherein performing video encoding on the video frame sequence to obtain encoded video data comprises:

for each non-key frame subjected to resolution conversion in the video frame sequence, performing video encoding on each sub-image block in the current non key frame at different code rates according to a different importance level of the sub-code rates according to a different importance level of the sub-image block, so as to obtain image block, so as to obtain encoded video data, wherein in the same non-key frame, the higher the importance level of the sub-image block, the higher the code rate at which video encoding is performed.

4. The video encoding method according to claim 1, wherein the video frame sequence further comprises a plurality of key frames acquired at a variable frame rate, wherein the variable frame rate changes in real time according to the movement speed and/or position of a carrier device acquiring the video frame sequence;

The method further comprises:
based on conversion being performed to make each sub-image block in each non-key frame have a resolution corresponding to the importance level of the sub-image block,
further making each key frame have the target highest resolution;
performing video encoding on the video frame sequence to obtain encoded video data comprises:
performing video encoding on the non-key frames subjected to resolution conversion and the key frame subjected to resolution conversion in the video frame sequence, to obtain encoded video data.

5. The method according to claim 1, wherein after reconstructing each of the non-key frames into a non-key frame having the target highest resolution, the method further comprises: performing deblocking filtering on the non-key frame having the target highest resolution.

6. A video coding apparatus, comprising:
a sub-image block level dividing module, configured to divide, for each non-key frame in a video frame sequence, a current non-key frame into a plurality of sub-image blocks according to information of an object in the current non-key image, and determine an importance level of each sub-image block, the video frame sequence comprising a plurality of non-key frames acquired at a predetermined frame rate;

a resolution conversion module, configured to perform, according to a pre-stored first correlation between different importance levels and different resolutions, conversion to make each sub-image block in each non-key frame have a resolution corresponding to the importance level of the sub-image block, wherein in the first correlation, a higher importance level corresponds to a higher resolution, and the highest importance level corresponds to a target highest resolution;

a video encoding module, configured to performing video encoding on the video frame sequence to obtain encoded video data;

a video decoding module, configured to perform video decoding on video data to obtain a decoded video frame sequence, wherein in each non-key frame in the decoded video frame sequence, an object area having a higher importance level has a higher resolution; and a video reconstructing module, configured to reconstruct each non-key frame into a non-key frame having the target highest resolution, to obtain a reconstructed video frame sequence having the target highest resolution, wherein for each non-key frame, acquiring a time instant of collection of the current non-key frame and a position of a carrier device collects at the time instant of collection of the current non-kev image;

determining, from the plurality of key frames, a first key frame at the time closest to the time instant of collection and a second key frame at the position closest to the position at the time instant of collection;

on the basis of the first key frame and the second key frame, and a pre-trained super-resolution model, determining interpolation data of an area, having a resolution lower than a target highest resolution, of the current non-key frame, so as to reconstruct the current non-key image into a non-key image having the target highest resolution, wherein the super-resolution model data is obtained by training with a predetermined number of frames collected from objects having importance levels lower than that of the target highest resolution; and combining the non-key frames reconstructed for each non-key frame and having the target highest resolution, to obtain a reconstructed video frame sequence having the target highest resolution.

7. A computer device, comprising a memory and a processor, the memory storing a computer program, wherein the computer program, when executed by the processor, implements the steps of the video coding method according to claim 1.

* * * * *